United States Patent [19]

Babbitt et al.

[11] Patent Number: 5,624,742
[45] Date of Patent: Apr. 29, 1997

[54] BLENDED LOOSE-FILL INSULATION HAVING IRREGULARLY-SHAPED FIBERS

[75] Inventors: Willilam M. Babbitt, New Albany; Steven G. Schmitt, Newark; Michael E. Evans; John R. Mumaw, both of Granville; Roberta L. Alkire, Millersport; W. Scott Miller; Ronald A. Houpt, both of Newark; Russell M. Potter, Hebron; Tod D. Green, Somerset; David P. Aschenbeck, Newark; Clarke Berdan, II, Granville, all of Ohio

[73] Assignee: Owens-Corning Fiberglass Technology, Inc., Summit, Ill.

[21] Appl. No.: 619,028

[22] Filed: Mar. 20, 1996

Related U.S. Application Data

[63] Continuation-in-part of Ser. No. 602,478, Feb. 20, 1996, which is a continuation of Ser. No. 309,698, Sep. 21, 1994, abandoned, which is a continuation-in-part of Ser. No. 148,098, Nov. 5, 1993, Pat. No. 5,431,992.

[51] Int. Cl.$^6$ .................. B32B 5/08; C03B 37/075; C03B 37/14; D04H 1/06
[52] U.S. Cl. .................. 428/212; 19/145.5; 19/296; 52/404.1; 65/438; 65/443; 156/62.2; 428/369; 428/370; 428/371; 428/392
[58] Field of Search .................. 52/404.1; 65/438, 65/443; 19/145.5, 296; 428/212, 297, 303, 369, 370, 371, 392; 156/62.2

[56] References Cited

U.S. PATENT DOCUMENTS

| | | |
|---|---|---|
| 2,219,285 | 10/1940 | Allen et al. |
| 2,998,620 | 9/1961 | Stalego. |
| 4,184,643 | 1/1980 | McCort. |
| 4,201,247 | 5/1980 | Shannon. |
| 4,296,164 | 10/1981 | Bemis et al. |
| 4,347,985 | 9/1982 | Simpson. |
| 4,366,927 | 1/1983 | Kielmeyer. |
| 4,373,005 | 2/1983 | Goodwin. |
| 4,542,044 | 9/1985 | Gano et al. |
| 4,555,447 | 11/1985 | Sieloff et al. |
| 4,640,082 | 2/1987 | Gill. |
| 4,682,523 | 7/1987 | Johnson et al. |
| 4,716,712 | 1/1988 | Gill. |
| 4,756,957 | 7/1988 | Kielmeyer. |
| 4,829,738 | 5/1989 | Moss. |
| 4,842,928 | 6/1989 | Kielmeyer. |
| 4,909,817 | 3/1990 | Gill et al. |
| 5,035,936 | 7/1991 | Dockrill. |
| 5,367,849 | 11/1994 | Bullock. |
| 5,431,992 | 7/1995 | Houpt et al. .................. 428/224 |

FOREIGN PATENT DOCUMENTS

| | | |
|---|---|---|
| WO95/12552 | 5/1995 | WIPO. |
| WO95/12701 | 5/1995 | WIPO. |

*Primary Examiner*—James C. Cannon
*Attorney, Agent, or Firm*—C. Michael Gegenheimer; Curtis B. Brueske

[57] ABSTRACT

A loose-fill insulation product is provided which is formed from a blend of first and second insulating materials having three-dimensional groups of fibers of different sizes and densities. At least one of the insulating materials is comprised of irregularly-shaped glass fibers comprised of two distinct glass compositions. When blended with the fibers of a standard insulation or with other irregularly-shaped fibers of different sizes, the resulting loose-fill insulation product shows improved coverage and thermal efficiency.

29 Claims, 1 Drawing Sheet

BLENDED LOOSE-FILL INSULATION HAVING IRREGULARLY-SHAPED FIBERS

This application is a continuation-in-part of the application, filed Feb. 20, 1996, entitled LOOSE-FILL INSULATION HAVING IRREGULARLY SHAPED FIBERS, which is a continuation of Ser. No. 08/309,698, filed Sep. 21, 1994 now abandoned, which was a continuation-in-part of Ser. No. 08/148,098, filed Nov. 5, 1993 now U.S. Pat. No. 5,431,992.

BACKGROUND OF THE INVENTION

The present invention relates to loose-fill or blowing wool insulation for sidewall or attic installation, and more particularly to a blended loose-fill insulation which utilizes irregularly-shaped glass fibers and provides improved coverage and reduced convection.

The use of glass fiber blowing wool or loose-fill insulation is well-known and increasing in popularity. Loose-fill insulation is preferred by many contractors because it can be easily and quickly applied in both new construction as well as in existing structures. Further, loose-fill insulation is a relatively low cost material.

As the name implies, loose-fill insulation is not Breed into a blanket or batt prior to installation. Rather, the product is generally installed by pneumatically blowing the loose-fill insulation into the desired area. Accordingly, loose-fill fiberglass insulation in an unconstrained space, such as an attic, is not as compacted as blanket insulation, occupying a greater volume than an equivalent amount of blanket insulation. As a result, the thermal conductivity or k value of loose-fill insulation in current use is generally higher than that of blanket insulation. That is, loose-fill insulation currently used in the industry does not inhibit the conduction of heat as well as blanket insulation. To compensate for the higher conductivity of loose-fill, it is applied in greater depth than blanket insulation to achieve an equivalent R-value.

Furthermore, in many applications, increased insulation depth is either not possible or impractical. For example, in sidewall installation, the depth (or in this instance the thickness of the wall) is limited by standard wall thicknesses such as 3.5 inches (8.9 cm) for a 2×4 (5×10 cm) wall or 5.5 inches (14 cm) for a 2×6 (5×15.2 cm) wall. To compensate for such thickness limits, a higher density loose-fill must be employed. In other words, more glass must be blown into the same mount of space. Also, in practice it has remained quite difficult to uniformly blow the required higher densities into the confined spaces of sidewalls.

When designing loose-fill or blown insulation products of glass fibers, the ideal insulation would have uniform spacing and density once installed. That is, the final product would preferably be free of gaps, spaces or voids between fibers. Insulation is basically a lattice for trapping air between the fibers and thus preventing movement of air. The lattice also retards heat transfer by scattering radiation. A more uniform spacing and density of the insulation would minimize air movement under extreme cold conditions and maximize scattering and, therefore, would have greater insulating capability.

Traditional loose-fill or blown insulation comprises traditional, straight, short fibers. Baits of traditional bindered or unbindered glass fibers are cut, milled, or otherwise formed into nodules, and then compressed and bagged for shipment. Upon installation, the compressed loose-fill is added to the hopper of a blowing machine where the loose-fill is mechanically opened and broken into smaller portions. However, after being blown into position, numerous small gaps or voids remain between the blown portions of insulation. These voids raise the thermal conductivity of the insulation, requiring more glass to be employed to achieve a specified insulating value.

While lighter density loose-fill insulating materials have been developed, a problem with convection within the body of the material occurs under extreme cold temperatures which adversely affects the R-value. For example, primarily straight bindered fibers of loose-fill insulation may be comprised of ½" milled nodules which are relatively large and very low in density. As a result, when the nodules are spread out or blown into place, there are voids in the interstices between the nodules which allow some convection of cold air.

Accordingly, a need exists for an improved loose-fill insulating material with a uniform volume filling nature and to an insulating material which provides good coverage and thermal efficiency when blown.

SUMMARY OF THE INVENTION

These needs are met by the present invention in which an improved loose-fill or blowing insulation is provided which is comprised of a blend of first and second insulating materials. The insulating materials are comprised of groups of fibers which differ in size such that one of the groups of fibers is larger than the other groups of fibers. When the insulation is installed, the larger groups of fibers provide high coverage and the smaller groups of fibers fill the voids between the larger groups. Thus, the blended insulation product of the present invention provides substantially uniform coverage upon installation and reduces or substantially eliminates convection of air.

According to one aspect of the present invention, a loose-fill insulation product is provided comprising a blend of a first insulating material comprised of a first series of three-dimensional groups of fibers having a first size and density and a second series of three-dimensional groups of fibers having a second size and density, where the groups of fibers of the second size are smaller than the groups of fibers of the first size. The density of the second series of groups of fibers is preferably greater than the density of the first series of the groups of fibers. However, it should be appreciated that the density of the first series of groups of fibers may be greater than the density of the second series of groups of fibers.

In addition, the fibers of at least one of the first or second insulating materials are irregularly-shaped glass fibers, wherein each fiber is comprised of two distinct glass compositions with different coefficients of thermal expansion. The irregularly-shaped glass fibers used in the present invention are preferably binderless, i.e., the binder materials comprise less than or equal to 1% by weight of the product. It should be noted that the term "binder" is not meant to include materials added for dust suppression or lubrication.

In a preferred embodiment of the invention, the three-dimensional groups of fibers comprise nodules, where the size of the nodules for the first series of fibers is at least ½ inch in at least one of the length, height and width directions, and the size of the nodules for the second series of fibers is less than ½ inch in the length, width and height directions.

For purposes of the present invention, the term nodules is meant to encompass groups of fibers which have been cut or milled to form three-dimensional shapes having either a uniform or nonuniform configuration, and having dimensions of generally less than about 1 inch. Where the fibers have been cut by a cubing device or a chopping device, the nodules are of a substantially uniform shape and size, while fibers which have been milled tend to form nodules having a more nonuniform shape and size.

The nodules of the irregularly-shaped fibers of the present invention, when blended with another group of fibers, tend to open up (i.e., expand in size) and assume the form of wisps which function to fill the voids between adjacent nodules.

In one embodiment of the invention, both of the first and second insulating materials comprise irregularly-shaped glass fibers, and the fibers of the first insulating material have been coated with a lubricant. The groups of fibers which have been coated with the lubricant are larger in size, while the uncoated groups of fibers of the second insulating material are smaller and more dense. In this embodiment, the weight ratio of the first insulating material to the second insulating material is from about 80:20 to 20:80, and more preferably, from about 50:50.

In another embodiment of the invention, the first insulating material comprises single-glass fibers and the second insulating material comprises irregularly-shaped glass fibers. In this embodiment, the groups of single-glass fibers are larger in size than the groups of irregularly-shaped fibers. The irregularly-shaped glass fibers may optionally be coated with a lubricant. In this embodiment, the weight ratio of the first insulating material to the second insulating material is about 80:20 to 20:80.

Preferably, at least a portion of the fibers of the first and second insulating materials are coated with a dust suppressant, anti-static agent, or both. The dust suppressant or anti-static agent may comprise mineral oil, a quaternary ammonium salt, or combinations thereof.

The present invention also provides a method of making the blended loose-fill insulation product comprising the steps of providing a first insulating material comprised of a first series of three-dimensional groups of fibers having a first size and density, providing a second insulating material comprised of a second series of three-dimensional groups of fibers having a second size and density, with the groups of fibers of the second size being smaller than the groups of fibers of the first size. The fibers of at least one of the first or second insulating materials are irregularly-shaped glass fibers. The first and second insulating materials are then blended together.

The method may also include the step of coating the fibers of the blend with a dust suppressant, anti-static agent, or both as described previously.

Where both the first and second insulating materials comprise irregularly-shaped fibers, an alternative method for making the blended loose-fill insulation product comprises the steps of forming irregularly shaped fibers, intermittently applying a lubricant to the fibers, and cutting or milling the fibers into groups of fibers, where a first group of fibers is coated with the lubricant and a second group is not coated with the lubricant. By applying the lubricant in this manner, the resulting insulation comprises a blend of lubricated and unlubricated fibers, where the lubricant functions to control the size and density of the nodules.

Upon handling and installation of the insulation, the smaller sized groups of fibers fill existing voids between the larger sized groups of fibers, providing a substantially uniform coverage and reduction in convection. When blown into an unconstrained area, the blended loose-fill insulation product of the present invention preferably has a thermal conductivity or k value of between about 0.25 to 0.50 Btu in/hrft$^2$° F. (0.036 to 0.072 Watts/m° C.) at a density of 0.45 to 2.00 pcf (7.2 to 32.0 Kg/m$^3$). The installed density of the insulation product is preferably between about 0.50 to 1.00 pcf(8.0 to 16.0 Kg/m$^3$).

When blown into a sidewall, the installed density of the insulation product is preferably between about 1.0 to 2.0 pcf(16.0 to 32.0 Kg/m$^3$).

Accordingly, it a feature of the present invention to provide a loose-fill insulation comprising a blend of first and second insulating materials having groups of fibers of different sizes and densities which include irregularly-shaped fibers, and to a loose-fill insulation which provides improved uniform coverage and thermal efficiency upon installation.

DETAILED DESCRIPTION OF THE INVENTION

Figure 1:
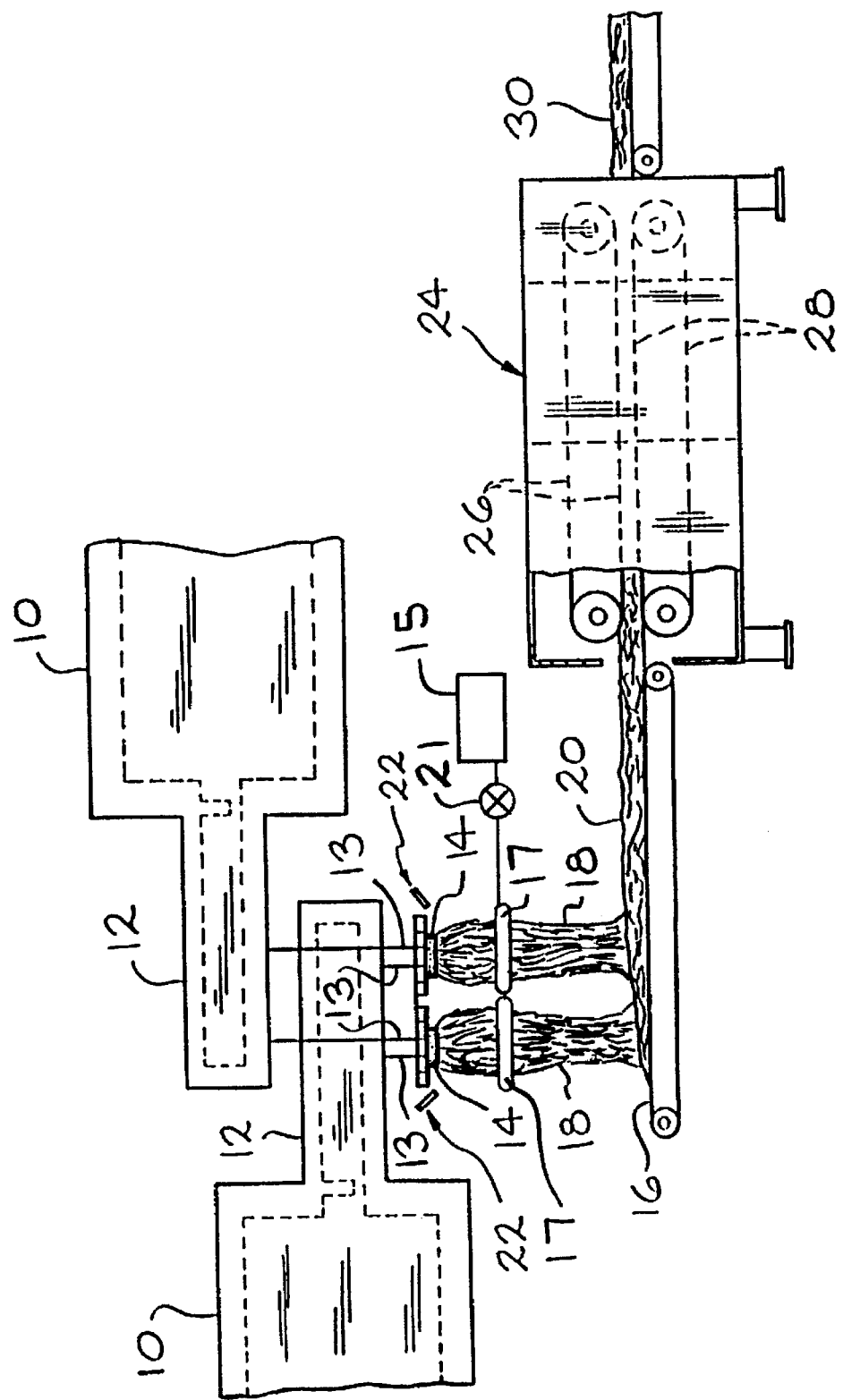
FIG. 1 is a schematic view in elevation of a process by which the loose-fill insulation of the present invention may be produced.

The blended loose-fill insulation of the present invention provides several advantages over the prior art loose-fill insulation which is typically comprised of large, low density nodules. While such nodules provide good coverage, due to their large size, when the insulation is blown into an attic or wall, voids or gaps remain between the pieces of insulation, thereby substantially reducing the insulation's ability to retard heat flow or convection.

The present invention, however, provides a blend of nodules which differ in size and density such that the larger sized nodules provide good coverage while the smaller sized nodules fill the voids between the large nodules. Thus, the present invention provides insulation which allows better coverage and which reduces or substantially eliminates convection problems.

The irregularly-shaped fibers used in the blended insulation product of the present invention can be produced from a rotary fiber forming process as shown in FIG. 1. The irregularly-shaped fibers are dual-glass fibers, i.e. each fiber is composed of two different glass compositions. Such fibers are disclosed in the copending parent application entitled LOOSE-FILL INSULATION HAVING IRREGULARLY SHAPED FIBERS, filed Feb. 20, 1996, and Houpt et al, U.S. Pat. No. 5,431,992, the disclosures of which are hereby incorporated by reference.

The dual-glass compositions of the present invention preferably comprise a high-borate, low-soda lime-aluminosilicate composition as one glass and a high-soda, low-borate lime-aluminosilicate composition as the other glass, which satisfy all constraints necessary for a successful irregularly-shaped fiber. Other known glass compositions may also be used. A wide range of proportions of the amounts of the two glasses may exist in the various irregularly-shaped glass fibers.

Preferably, the coefficients of thermal expansion of the glasses, as measured on the individual glasses by standard rod techniques, differ by at least 2.0 ppm/° C. The dual-glass fibers have a curvilinear nature due to this difference in thermal expansion coefficients. An irregularly-shaped fiber of the invention differs from a helical fiber in that the rotation of the fiber is not constant, but rather varies irregularly both in direction (clockwise and counter-clockwise) and in magnitude. Thus, each irregularly-shaped fiber is twisted in a unique way. No two fibers are exactly alike. The fiber's irregular nature allows the irregularly-shaped glass fibers to stand apart from one another and achieve a uniform volume filling nature.

By uniform volume filling, it is meant the fibers have a desire to spread out and fill the entire volume available to them in a uniform manner when blown. A more uniform volume filling nature allows a more efficient use of glass fibers to resist the convective flow of heat. Thus, by combining nodules of irregularly-shaped fibers with different sized nodules of irregularly-shaped or standard insulation fibers, excellent coverage and minimization of convection are achieved as the gaps or voids between the larger nodules are filled in by the smaller nodules of the insulation.

Referring now to FIG. 1, streams 13 of two distinct molten glass compositions are supplied from furnaces 10 via forehearths 12 to fiberizers 14. Veils of irregularly-shaped glass fibers 18 produced in fiberizers 14 are blown downward by means of blowers 22 and collected on a conveyor 16 to form a fibrous blanket 20. As the fibers are blown downward and cool, they assume their irregular shape.

In the embodiment where both the first and second insulating materials comprise the irregularly-shaped fibers, the fibers may be coated after being formed by applying a lubricant intermittently to the fibers as the fibers 18 are blown downward. To accomplish this, rings or series of nozzles 17 are positioned around the veil of fibers which supplies a lubricant from source 15 to the fibers. The supply of lubricant is controlled by a rotary valve 21, which regulates the amount of lubricant and length of time it is applied to the fibers. By opening and closing valve 21 intermittently, different sections of the fibers become coated while other sections remain uncoated. A suitable lubricant for use in the present invention is available from Henkel under the designations Emerlube™ or Emerest™. Preferably, the lubricant is applied to the fibers at a rate of between about 0.05% to 0.30% by weight, and more preferably, about 0.10% by weight.

After the lubricant is applied and the fibers are collected on the conveyor to form a shaped fibrous blanket 20, the blanket is then fed through a cutting or milling device (not shown) where the blanket is preferably cut or milled into nodules of approximately the same size. The insulation may be cut or milled using conventional milling, cubing or chopping equipment. A suitable milling device is available from Jeffrey Manufacturing. A suitable cubing device is disclosed in the copending parent application entitled LOOSE-FILL INSULATION HAVING IRREGULARLY SHAPED FIBERS, filed Feb. 20, 1996. A preferred chopping device is available from Owens Corning (#775) which utilizes a helical Chevron cutter head.

In an alternative embodiment, the lubricant may be applied to an entire tow of irregularly-shaped fibers as they are formed. In a separate process, a second tow of irregularly-shaped fibers may be formed without the application of the lubricant. The two sets of fibers may then be subsequently cut or milled and then blended together.

In another embodiment of the invention, the first insulating material comprises irregularly-shaped fibers and the second insulating material comprises single-glass fibers. In this embodiment, the second insulating material preferably comprises a standard insulating material, i.e., an insulating material comprising primarily straight, single-glass fibers. Suitable standard insulating materials include ADVANCED THERMACUBE PLUS™, THERMAGLAS™, and STANDARD BLEND™, all available from Owens Corning. Such single-glass fibers are generally not uniform in volume filling, but when blended with the irregularly-shaped fibers of the present invention, the gaps or voids between the various large nodules of standard insulation are filled in by the smaller nodules or wisps of the irregularly-shaped fibers. Thus, while the single-glass fibers and the irregularly-shaped fibers of the present invention may be cut or milled to almost the same size, when blended together, the nature of the irregularly-shaped fibers is to open up and spread out such that the smaller wisps of irregularly-shaped fibers fill in the voids between the nodules of the single-glass fibers.

In this embodiment, the irregularly-shaped fibers may or may not be coated with a lubricant, depending on the desired application.

Once the groups of fibers are cut or milled, the different sized nodules are blended together, compressed and bagged for shipment. If desired, the blend of fibers is sprayed with a dust suppressant and/or an anti-static agent after cutting. Preferably, the dust suppressant is a mineral oil, quaternary ammonium salt or combinations thereof. If a quaternary ammonium salt is employed, the dust suppressant/anti-static agent is preferably is a modified fatty dimethyl ethylammonium ethosulfate. Suitable quaternary ammonium salts are disclosed in U.S Pat. No. 4,555,447 to Sieloff et al, the disclosure of which is herein incorporated by reference. To aid in coating ability, the quaternary ammonium salt may be mixed with a non-ionic lubricant material. A suitable dust suppressant/anti-static agent is available under the tradename MAZON JMR-1 and is available from PPG Industries, Inc. in Pittsburgh, Pa. The dust suppressant/anti-static agent may be applied by traditional means such as dilution with water, followed by spraying onto the cut loose-fill insulation.

Once at the installation site, the blended loose-fill insulation of the present invention may be unpackaged and installed by hand or preferably by blowing. Where the insulation is blown, the insulation is added to the hopper of a standard blowing device and blown into position, thereby expanding and recovering in the process. Blowing can be performed with any conventional blowing technology known in the art.

Once blown, the insulation provides a uniform volume filling, i.e., the voids between the larger nodules are filled in by the smaller nodules. The uniform volume filling nature of a insulating material may be additionally indicated by measuring thermal conductivity. Building insulation products are quantified by their ability to retard heat flow. Resistance to heat flow or R value is the most common measure of an insulation product's ability to retard heat flow from a structure. R-value is defined by the equation: R value=t/k, where R-value is resistance to heat flow in hrft$^{2\circ}$ F./Btu (m$^{2\circ}$ C./Watt); t is recovered thickness in inches; and k is thermal conductivity in Btu in/hrft$^{2\circ}$ F. (Watt/m° C.).

Thermal conductivity or k value is a measure of a material's ability to conduct heat. Thus, the lower a material's k value the better that material is as an insulator. The more uniform the lattice of the material, the greater that material's insulation ability. Thus, thermal conductivity can be a measure of the uniform volume filling nature of the insulation material. When blown into an unconstrained area, the loose-fill insulation of the present invention has a k value ranging from about 0.25 to 0.50 Btu in/hr$^{2\circ}$ F. (0.036 to 0.072 Watt/m° C.) at a density of from 0.45 to 2.0 pcf(7.2 to 32.0 Kg/m$^3$).

In order that the invention may be more readily understood, reference is made to the following examples, which are intended to be illustrative of the invention, but are not intended to be limiting in scope.

EXAMPLE 1

A blended loose-fill insulation product was prepared in accordance with the present invention using one bag of Miraflex™ fibers (Owens Corning) which had been treated with lubricant during formation, and one bag of Miraflex™ fibers which had not been coated with lubricant during formation. The densities of the two materials were 0.33 pcf and 1.02 pcf, respectively. The treated fibers were approximately ½–¾ inch in size, while the untreated fibers ranged from ⅛–¼ inch in size. The bag weights were 24.10 and 25.10 lbs., respectively, so the mix was very close to a weight ratio of 50:50. The two bags were hand mixed in a hopper and sprayed with a dust suppressant/anti-static agent available from PPG Industries, Inc. under the tradename MAZON JMR-1. The material was blown at a rate of 12.62 lb/min. The blown density and coverage (based on 8 ¾" blown thickness), and dust levels are shown below in Table I. The dust level was determine used Owens Corning test method D04A.

|  | Density (pcf) | Coverage (sq. ft.) | Dust (gm/35 lb. bag) |
|---|---|---|---|
| Miraflex ™ (with lubricant)/ Miraflex ™ (without lubricant) | 0.487 | 98.56 | 0.914 |

EXAMPLE 2

A loose-fill insulation product was produced using a blend of Miraflex™ fibers which were cut using a cubing device and oversprayed with an anti-static agent and a light-weight oil, and standard loose-fill insulating material. The standard loose-fill was coated with an anti-static agent prior to blending with the Miraflex™ fibers. The Miraflex™ and standard fibers were mixed in a hopper and blown at a rate of 15.47 lb/min and a thickness of 8 ¾".

The results are shown below in Table II.

TABLE II

|  | Density (pcf) | Coverage (sq. ft.) | Dust (gm/35 lb. bag) |
|---|---|---|---|
| Miraflex ™/ Standard insulation | 0.53 | 89.58 | 0.754 |

After blowing it was observed that the standard loose-fill insulation remain more compressed and in a larger, denser form while the Miraflex™ fibers opened and wisps could be observed in and around the standard insulation.

EXAMPLE 3

Two blends of standard insulating fibers and Miraflex™ fibers were produced in which the first blend comprised about 80% SR/HT standard insulation and 20% Miraflex™, and the second blend comprised about 80% RA23 and 20% Miraflex™ fibers. The materials were nonuniform in the hopper, but blew to a very homogeneous material in the attic. The results after blowing to a thickness of 8 ¾" are shown below.

TABLE 3

|  | Density (pcf) | Coverage (sq. ft.) | Dust (gm/35 lb. bag) | Blow rate (lb/min.) |
|---|---|---|---|---|
| 80/20 SR/HT/ Miraflex ™ | 0.731 | 65.63 | 1.373 | 20.10 |
| 80/20 RA23/ Miraflex™ | 1.064 | 45.12 | 0.569 | 22.63 |

Having described the invention in detail and by reference to the preferred embodiments thereof, it will be apparent that modifications and variations are possible without departing from the scope of the invention which is defined in the appended claims.

We claim:

1. A loose-fill insulation product comprising a blend of a first insulating material comprised of a first series of three-dimensional groups of fibers having a first size and density and a second series of three-dimensional groups of fibers having a second size and density, said second size being smaller than said first size; wherein the fibers of at least one of said first or second insulating materials are irregularly-shaped glass fibers wherein each fiber is comprised of two distinct glass compositions with different coefficients of thermal expansion.

2. A loose-fill insulation product as claimed in claim 1 wherein said three-dimensional groups of fibers comprise nodules.

3. A loose-fill insulation product as claimed in claim 2 wherein said size of said nodules for said first series of fibers is at least ½ inch, and the size of said nodules for said second series of fibers is less than ½ inch.

4. A loose-fill insulation product as claimed in claim 1 wherein the density of said second series of said groups or fibers is greater than the density of said first series of said groups of fibers.

5. A loose-fill insulation product as claimed in claim 1 wherein the density of said first series of groups of fibers is greater than the density of said second series of said groups of fibers.

6. The loose-fill insulation product as claimed in claim 1, wherein both of said first and second insulating materials comprise said irregularly-shaped glass fibers and wherein said fibers of said first insulating material have been coated with a lubricant.

7. The loose-fill insulation product as claimed in claim 1, wherein the weight ratio of said first insulating material to said second insulating material is from about 80:20 to 20:80.

8. The loose-fill insulation product as claimed in claim 1, wherein the weight ratio of said first insulating material to said second insulating material is about 50:50.

9. The loose-fill insulation product as claimed in claim 1, wherein said first insulating material comprises single-glass fibers and said second insulating material comprises said irregularly-shaped glass fibers.

10. The loose-fill insulation product as claimed in claim 9, wherein said irregularly-shaped glass fibers have been coated with a lubricant.

11. The loose-fill insulation product of claim 9, wherein the weight ratio of said first insulating material to said second insulating material is about 80:20 to 20:80.

12. The loose-fill insulation product of claim 1 in which at least a portion of said fibers of said first and second insulating materials have been coated with a dust suppressant, anti-static agent, or both.

13. The loose-fill insulation product as claimed in claim 1 having a k value of from about 0.25 to 0.50 Btu in/hrft$^2$° F. (0.036 to 0.072 Watt/m° C.) at a density of from 0.45 to 2.00 pcf (7.2 to 32.0 Kg/m$^3$).

14. The loose-fill insulation product as claimed in claim 1 having an installed density of between about 0.50 to 1.00 pcf (8.0 to 16.0 Kg/m$^3$).

15. The loose-fill insulation as claimed in claim 2 wherein upon handling and installation of said insulation the smaller nodules fill existing voids between the larger nodules providing said insulation with a substantially uniform coverage.

16. A method of making a blended loose-fill insulation product comprising the steps of:

provflwing a first insulating material comprised of a first series of three-dimensional groups of fibers having a first size and density;

providing a second insulating material comprised of a second series of three-dimensional groups of fibers having a second size and density, said second size being smaller than said first size of said fibers; wherein the fibers of at least one of said first or second insulating materials are irregularly-shaped glass fibers wherein each fiber is comprised of two distinct glass compositions with different coefficients of thermal expansion; and blending said first and second insulating materials together.

17. The method as claimed in claim 16 wherein said three-dimensional groups of fibers comprise nodules.

18. The method as claimed in claim 16 wherein said size of said nodules for said first series of fibers is at least ½ inch, and the size of said nodules for said second series of fibers is less than ½ inch.

19. The method as claimed in claim 16 wherein the density of said second series of said groups of fibers is greater than the density of said first series of said groups of fibers.

20. The method as claimed in claim 16 wherein the density of said first series of said groups of fibers is greater than the density of said second series of said groups of fibers.

21. The method as claimed in claim 16 wherein both of said first and second insulating materials comprise irregularly-shaped glass fibers and wherein said fibers of said first insulating material have been coated with a lubricant.

22. The method as claimed in claim 21 wherein the weight ratio of said first insulating material to said second insulating material is from about 80:20 to 20:80.

23. The method as claimed in claim 21 wherein the weight ratio of said first insulating material to said second insulating material is about 50:50.

24. The method as claimed in claim 16 wherein said first insulating material comprises single-glass fibers and said second insulating material comprises said irregularly-shaped glass fibers.

25. The method as claimed in claim 24 wherein said irregularly-shaped glass fibers have been coated with a lubricant.

26. The method as claimed in claim 24, wherein the weight ratio of said first insulating material to said second insulating material is about 80:20 to 20:80.

27. The method as claimed in claim 16 including the step of coating said fibers of said blend with a dust suppressant, anti-static agent, or both.

28. The method as claimed in claim 27 wherein said dust suppressant or anti-static agent is mineral oil, a quaternary ammonium salt or combinations thereof.

29. A method of making a blended loose-fill insulation product comprising the steps of:

forming irregularly shaped fibers, said fibers being comprised of two distinct glass compositions with different coefficients of thermal expansion;

intermittently applying a lubricant to said fibers;

cutting or milling said fibers into groups of fibers, where one group of fibers is coated with said lubricant and the other group is not coated with said lubricant.

* * * * *